United States Patent [19]

Hanak et al.

[11] Patent Number: 5,066,685
[45] Date of Patent: Nov. 19, 1991

[54] FIBRE-REINFORCED RIGID POLYURETHANE FOAM AND POLYOL COMPONENT THEREFOR

[75] Inventors: Pavel Hanak, Thuit Signol, France; Philippe Motte, Media, Pa.; Patrice Gosset, Verneuil en Halatte, France

[73] Assignee: ARCO Chemical Technology, Inc., Wilmington, Del.

[21] Appl. No.: 483,605

[22] Filed: Feb. 22, 1990

[30] Foreign Application Priority Data

Jul. 3, 1989 [GB] United Kingdom ............... 8905206

[51] Int. Cl.$^5$ .............................................. C08G 18/14
[52] U.S. Cl. .................................... 521/163; 521/167; 528/53; 528/54; 528/73; 528/111; 524/400
[58] Field of Search ............... 521/163, 167; 528/111, 528/53, 54, 73, 400

[56] References Cited

U.S. PATENT DOCUMENTS

| | | |
|---|---|---|
| 4,456,715 | 6/1984 | Rottmaier et al. ................ 524/400 |
| 4,500,655 | 2/1985 | Brennan ............................ 521/163 |
| 4,731,427 | 3/1988 | Younes .............................. 528/53 |

Primary Examiner—John Kight, III
Assistant Examiner—Duc Truong
Attorney, Agent, or Firm—Dennis M. Kozak; David L. Mossman

[57] ABSTRACT

Polyol compositions suitable for use in the production of fibre-reinforced rigid polyurethane foam comprises (a) at least one amino polyol obtainable by reacting an alkylene oxide with an initiator which has a functionality greater than 2, at least one aromatic ring and at least one amino nitrogen atom and (b) at least 3% by weight, based on the total weight of (a) plus (b), of an adduct of a tertiary amine and an alkylene carbonate. These novel polyol compositions provide foam-forming formulations of suitable viscosity without the need to use a CFC blowing agent and also combine high reactivity with a broad reactivity profile.

30 Claims, No Drawings

FIBRE-REINFORCED RIGID POLYURETHANE FOAM AND POLYOL COMPONENT THEREFOR

This invention relates to novel polyol compositions suitable for use in the production of fiber reinforced polyurethane foams and also to the reinforced polyurethane foams obtained from these compositions.

It is known to produce polyurethanes by the reaction of polyisocyanates with polyols. Foamed products may be obtained by including a blowing agent in the polyurethane-forming formulation. Fiber-reinforced rigid polyurethane foam products having a useful combination of properties may be obtained by impregnating a fibrous material such as a glass fiber web, e.g. mat or scrim, with the foam-forming composition and then allowing the composition to expand and set. The products find use in furniture and in trim parts for cars, e.g. door panels, parcel shelves, dashboards, roof-liners and arm rests.

To be suitable for use in the production of such fiber reinforced rigid foam materials, the foam-forming formulation should have relatively short cure and demold times and the fluidity (low viscosity) required to ensure that it both adequately wets and penetrates the fiber web. It should also have a sufficiently broad reactivity profile to enable its use in a wide range of molding techniques, and adequate physical properties, such as of toughness and rigidity, in the molded state.

With the conventional polyols employed in these formulations, however, the viscosity of the foam-forming formulation tends to be too high unless a chlorofluorocarbon (CFC) is employed as the blowing agent, and the reactivity of the formulation tends to be low so that large quantities of catalyst are required to achieve acceptable cure and demold times. While the viscosity-reducing effect of the chlorofluorocarbon can be provided alternatively by use of other viscosity reducing agents, in general these do not become fixed in the foam structure and can evaporate at elevated temperatures. Moreover, they tend to affect the reactivity of the composition adversely.

The present invention provides a novel polyol composition which can provide foam-forming formulations which have the desired viscosity without the need to use a CFC blowing agent or other viscosity-reducing agent and yet which combine high reactivity with a sufficiently broad reactivity profile to permit them to be used in a wide range of molding techniques; e.g. from open pour molding to injection molding. The polyol composition of the invention comprises an amino polyol and an adduct of a tertiary amine and an alkylene carbonate.

U.S. Pat. No. 3,703,520 describes the use of an adduct of ethylene carbonate and triethylene diamine as a catalyst for the trimerisation of isocyanates and U.S. Pat. No. 4,033,908 describes the preparation of isocyanurate foam by reaction of an isocyanate in the presence of a blowing agent, a plasticising amount of a non-volatile liquid carbonate, and a trimerisation catalyst which may be triethylene diamine.

U.S. Pat. No. 4,500,655 claims that faster reaction profiles are attainable in the production of rigid polyurethane foams where the polyol component is obtained by reacting melamine with a lower alkylene carbonate in the presence of a propoxylated Mannich condensate. The blowing agents employed are haloalkanes and low boiling point hydrocarbons.

U.S. Pat. No. 4,731,427 describes the use of a soluble adduct of tertiary amine and cyclic alkylene carbonate as a catalyst in the formation of essentially non-cellular rigid polyurethane modified polyisocyanurate polymer moldings by reaction injection molding. The molded compositions are said to have improved mold release properties.

According to the present invention there is provided a polyol composition suitable for use in the production of fiber reinforced rigid polyurethane foams, said composition comprising (a) at least one amino polyol obtainable by reacting an alkylene oxide with an initiator which has a functionality greater than 2, at least one aromatic ring and at least one amino nitrogen and (b) at least 3% by weight, based on the total weight of (a) plus (b), of a pre-formed adduct of a tertiary amine and an alkylene carbonate.

If desired, part of the amino polyol in said composition may be replaced by at least one other polyol; however as the benefits of the invention tend to decrease with decrease in the amount of amino polyol in the composition, it is preferred that said at least one amino polyol forms at least 50% by weight of the total amount of polyol in the composition.

The various components of the composition will now be described in more detail. By an amino polyol, as that term is employed in this specification, is meant a polyol which contains at least one amino nitrogen atom. Preferably, the amino nitrogen atom of the initiator will have at least one substituent containing a primary and-/or secondary hydroxyl group and the nitrogen will be attached to the aromatic ring by an alkylene group, preferably a methylene group.

Preferred examples of the amino polyols are those derived by reaction of one or more alkylene oxides with Mannich condensation products obtained by the reaction of at least one phenolic compound with formaldehyde and an alkanolamine.

The phenolic compound to be employed in the Mannich condensation is an aromatic compound containing at least one hydroxyl group attached directly to the aromatic nucleus and having a hydrogen atom on one or more of the ring positions ortho and para to the hydroxyl group and which is otherwise unsubstituted or substituted with substituent groups which are non-reactive under Mannich reaction conditions. Substituent groups that may be present include alkyl, cycloalkyl, aryl, halo, nitro, carboalkoxy, haloalkyl and hydroxyalkyl.

The preferred phenolic compounds are phenol and monoalkyl substituted phenols, especially nonylphenol. Examples of other phenolic compounds that may be suitable are listed in our copending British patent application 8823528.8.

A preferred alkanolamine is diethanolamine. Examples of other alkanolamines that may be suitable are also listed in said copending application.

Formaldehyde may be employed in the Mannich reaction in any of its conventional forms, such as an aqueous formalin solution, an "inhibited" methanol solution, paraformaldehyde or trioxane.

The Mannich condensation product is reacted with an alkylene oxide or a mixture of alkylene oxides to form the polyol. Preferably the alkylene oxide is propylene oxide or a mixture thereof with ethylene oxide but other examples are butylene oxide and cyclohexene oxide and mixtures thereof with each other and/or with propylene oxide and/or ethylene oxide.

The characteristics of the amino polyol may be varied over wide limits by choice of phenolic compound, alkanolamine and alkylene oxide and by varying the molar ratios of the reactants; that is the molar ratios of phenolic compound, alkanolamine and formaldehyde employed to form the initiator and the molar ratio of alkylene oxide to initiator. While polyols having a functionality of as much as 7 may be obtained, preferably the functionality is in the range of about 3 up to 5.

In general, it is preferred that the amino polyol have an OH value (mg/KOH/g) in the range 300–650 and a molecular weight in the range 600–1000, more preferably 600–750.

In the formation of the Mannich product, it is generally preferred to avoid those conditions, such as the use of excess formaldehyde, which may lead to the formation of polymethylene derivatives of phenol by the Novolak reaction.

As indicated above, part of the amino polyol may be replaced by at least one other polyol. In general, however, it is preferred that the amount of said at least one other polyol does not exceed 50% by weight of the total weight of polyol in the composition since otherwise the benefits of using the combination of amino polyol and amine/carbonate adduct may not be achieved to adequate extent.

While any other polyol may be used, it is preferred to use polyols conventionally used for the production of rigid polyurethane foams, especially sucrose-based polyols, sorbitol-based polyols or mixtures thereof. Additionally or alternatively, however, it may be desirable to include a short chain polyol for the purpose of reducing the viscosity of the overall polyol composition. In general, it is preferred that such additional polyol have an OH value (mg KOH/g) in the range 400–550 and that such short chain low viscosity polyols have a functionality in the range 3 to 4, an OH value (mg KOH/g) in the range 300–600 and a molecular weight in the range 250–750. As will be understood by those skilled in the art of rigid polyurethane foams, where a part of the amino polyol is replaced by at least one other polyol, the overall functionality of the mixture of polyols should preferably be at least about 3 and more preferably at least about 4.

The tertiary amine employed to form the adduct with the alkylene carbonate is preferably free of primary and secondary amino groups.

Examples of tertiary amines that may be used include, for example, N-methyl morpholine, N-ethyl morpholine, dimethylaminocyclohexane, triethylenediamine, bis (dimethylaminoethyl)ether, dimethylethanolamine, 1,4-dimethyl-piperazine, trimethylaminopropylethanolamine, trimethylhydroxyethyl ethylenediamine, N,N,N',N'-tetramethyl ethylene diamine and the like. The preferred tertiary amine, however, is triethylene diamine.

Examples of alkylene carbonates that may be used are those having the general formula:

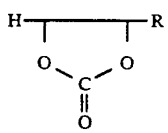

Generally, at least 0.2 part of amine will be employed per 100 parts of carbonate, by weight. As the amount of amine is increased, so is the reactivity of the composition of the adduct and polyol. Thus, the maximum amount employed will depend upon the reactivity of the amino polyol, the quantity of adduct employed, and also the quantity and reactivity of any other polyol which is present with the amino polyol in the composition. In general, it has been found that the best results are obtained if the amine is employed in the range of 0.2 to 1.0 part per 100 parts of carbonate, by weight, and preferably 0.25 to 0.5 parts per 100. However, the use of amounts greater than 1 part per 100 parts of carbonate may be appropriate in cases, for example, where the reactivity of the amino polyol is relatively low and/or a significant proportion of other polyol of relatively low reactivity is included in the composition.

The result of combining the alkylene carbonate with the tertiary amine may be a complex or a mixture of the complex with one or other of the alkylene carbonate and tertiary amine if either is used in excess of that involved in forming the complex. The term "adduct", as used herein, includes both the complex and the mixture thereof with any unreacted component.

If the tertiary amine/alkylene carbonate adduct is employed in an amount of less than 3% of the total weight of said adduct and polyol (meaning amino polyol or mixture of polyols where a part of the amino polyol is replaced by at least one other polyol), the viscosity of polyurethane foam forming compositions derived therefrom tends to be too high for use without a viscosity reducing agent such as a chlorofluorocarbon blowing agent. In general, it is preferred that the adduct forms at least 5%, and more preferably at least 10%, by weight of the combined weight of adduct and polyol.

As the concentration of the adduct increases, the viscosity of the mixture of adduct and polyol tends to decrease but the time required to cure foam formulations derived from the composition tends to increase. On the other hand, as the concentration of polyol increases, the viscosity of the composition generally increases but physical properties of the foam derived from the composition, especially stiffness, tend to improve. In general, therefore, it is preferred that polyol forms at least 50% by weight of the combined weight of polyol and adduct. Optimum results are generally obtained with from 5 to 25 parts of adduct and 95 to 75 parts of polyol by weight. In any event for the formulation to be suitable for use with conventional machinery for mixing and dispensing the foam-forming formulations, it is preferred that the viscosity of the combination of polyol and adduct is in the range of about 750 to 1500 mPa.s at 23° C.

To form a fiber reinforced rigid polyurethane foam, the composition comprising adduct and polyol is reacted with polyisocyanate in the presence of a blowing agent and in contact with the fibrous reinforcement. A surfactant is also usually included in the foam-forming composition and may be chosen from the surfactants normally employed in the production of rigid polyurethane foams.

The polyisocyanate employed in the formation of the fiber reinforced rigid foam will normally be selected from diphenyl methane diisocyanates, polymethylene polyphenylisocyanates having a functionality in the range 2.1 to 3.2, preferably 2.5 to 3.2 and an equivalent weight in the range 120 to 180, preferably 130 to 145, and mixtures thereof. Such polyisocyanates are available commercially as MDI. Polyurethane-forming and/or trimerisation catalysts may be used in the formulation. Examples of the former are metal salts such as potassium acetate. Examples of the latter are amines, e.g. triethylene diamine. Delayed effect catalysts such as those based on blocked amines may also be used, e.g. Dabco X 8154 and Toyocat TF.

Any suitable blowing agent may be employed to form the foam. However, it is a feature of the invention that adequately fluid foamforming compositions are attainable without the need to use chlorofluorocarbons. Thus, the blowing agent may comprise water and preferably consists substantially entirely of water and is essentially free of chlorofluorocarbons, with consequential environmental and cost benefits.

The invention will now be illustrated in the following Examples.

EXAMPLE 1

| Component A (parts by weight) | |
| --- | --- |
| ARCOL 3758 | 75 |
| ARSET 500 | 25 |
| Water | 0.5 |
| Glycerine | 1 |
| TEGOSTAB 8404 | 0.5 |
| Potassium acetate | 1 |
| DMEA | 0.2 |
| DMCHA | 0.2 |
| Toyocat TF (catalyst) | 1 |
| Carbon Black | 6 |

Component B p.MDI: 140 parts per 100 parts of polyol blend, by weight (Index 115).

A back panel for the front seat of an automobile was obtained by mixing Component A with Component B using a high pressure machine (EMB). The reactive blend so obtained was poured into an open mould containing glass fiber mat Vetroflex Unifilo U225 gr/m2.

The demoulding time was 2 minutes 30 seconds at 55° C. mould temperature. The part thickness was 3 mm.

ARCOL 3758 is a blend, with a typical OH number of 550 mg KOH/g, of 75 parts by weight of propoxylated Mannich adduct of phenol and dialkanolamine and having a functionality of 3, and 25 parts by weight of propoxylated diethanolamine having a functionality of 3.

ARSET 500 is an adduct of 0.5 parts by weight triethylene diamine with 100 parts by weight propylene carbonate.

DMEA is Dimethylethylamine
DMCHA is dimethylcyclohexylamine.

EXAMPLE 2

| Component A (parts by weight) | |
| --- | --- |
| ARCOL 3758 | 90 |
| ARSET 500 | 10 |
| Water | 1 |
| Glycerine | 1 |
| TEGOSTAB 8404 | 0.5 |
| Toyocat TF | 0.5 |

Component B

Isocyanate Suprasec VM50, 158 parts per 100 parts, by weight, of polyol blend (Index 115).

A dashboard moulding for an automobile was formed by mixing Component A with Component B using a SECMER low pressure machine and the mixture was dispensed into a open mould into which had previously been placed a thermoformed PVC skin and glass fiber mat Vetrotex Unifilo U400 g/m2.

The demould time was 3 minutes at a mould temperature of 40° C.

EXAMPLE 3

| Component A (parts by weight) | |
| --- | --- |
| ARCOL 3758 | 75 |
| ARSET 500 | 25 |
| Water | 1 |
| Glycerine | 2 |
| TEGOSTAB 8404 | 0.5 |
| Potassium acetate | 0.5 |
| Toyocat TF | 1 |

Component B p.MDI: isocyanate 146 parts per 100 parts of polyol blend, by weight (Index 115).

A moulding of an inner door panel for an automobile was obtained by mixing Components A and B together and injecting the mixture into a closed mould using a Cannon high pressure machine.

One layer of Vetrotex Unifilo U400 g/m2 had been placed inside the mould prior to injection of the mixture.

The demould time was 3 minutes 30 seconds at a mould temperature of 50° C.

| Component A | | |
| --- | --- | --- |
| | Formulation 1 | Formulation 2 |
| ARCOL 3758 | 85 | 90 |
| ARSET 500 | 15 | 10 |
| Water | 1 | 1 |
| Glycerine | 1 | 1 |
| TEGOSTAB B8404 | 0.5 | 0.5 |
| Toyocat TF | 0.25 | 0.25 |
| Viscosity of mixture of ARCOL 3758 & ARSET 500 (23° C.) | 780 mPa.s | 1450 mPa.s |

Component B p.MDI: to isocyanate Index 115.

Polyol formulations 1 and 2 were mixed in separate experiments with the indicated amount of Polyisocyanate Component B and the mixture used to form a series of fiberglass-reinforced rigid foam plaques 5 mm thick by injection moulding using a high pressure HK270 machine and glass fiber mats of various densities. The cream, gel and rise times of the mixtures and the properties of the moulded plaques are set out below.

| | | Formulation 1 | Formulation 2 |
| --- | --- | --- | --- |
| Bench mix reactivity: | cream time(s): | 25 | 26 |
| | gel time(s): | 42 | 44 |
| | rise time(s): | 46 | 48 |

|  |  | Formulation 1 | | | Formulation 2 | | |
|---|---|---|---|---|---|---|---|
| Reactivity of mix obtained from HK270 machine: | | | | | | | |
| | cream time(s) | 15 | | | 16 | | |
| | rise time(s) | 38 | | | 40 | | |
| Fiberglass mat density | (g/m$^2$) | 225 | 450 | 675 | 225 | 450 | 675 |
| Moulded Density | (kg/m$^3$) | 635 | 560 | 575 | 640 | 680 | 690 |
| Fiberglass weight | (%) | 7.1 | 16 | 23.5 | 7 | 13 | 20 |
| Flexural modulus[1] | (MPa) | 1410 | 1225 | 1700 | 1500 | 1740 | 2340 |
| Flexural strength[1] | (MPa) | 41 | 34 | 46 | 45 | 50 | 68.5 |
| Deflection at break[1] | (mm) | 10 | 9 | 6.5 | 10 | 8 | 6.5 |

[1] Measured using French Standard Test Procedure NFT 51001

We claim:

1. A polyol composition suitable for use in the production of fiber reinforced rigid polyurethane foams, said composition comprising (a) at least one amino polyol obtainable by reacting an alkylene oxide with an initiator which has a functionality greater than 2, at least one aromatic ring and at least one amino nitrogen atom and (b) at least 3% by weight, based on the total weight of (a) plus (b), of an adduct of a tertiary amine and an alkylene carbonate.

2. A polyol composition as claimed in claim 1 wherein said amino polyol is an alkoxylated Mannich condensate of a phenolic compound, formaldehyde and an alkanolamine.

3. A composition as claimed in claim 1 in which said adduct forms from 5 to 50% by weight of the total weight of (a) plus (b).

4. A composition as claimed in claim 1 in which said adduct forms from 5 to 25% by weight of the total weight of (a) plus (b).

5. A composition as claimed in claim 1 in which the adduct is formed from 0.2 to 1.0 part of tertiary amine per 100 parts of carbonate, by weight.

6. A composition as claimed in claim 1 in which the adduct is formed by aging a mixture of tertiary amine and alkylene carbonate.

7. A composition as claimed in claim 1 in which the tertiary amine is triethylene diamine.

8. A composition as claimed in claim 1 in which the alkylene carbonate is propylene carbonate.

9. A polyol composition as claimed in claim 1 in which a part of the amino polyol is replaced by at least one other polyol.

10. A composition as claimed in claim 9 wherein said at least one other polyol forms no more than 50% by weight of the total weight of polyol in the composition.

11. A composition as claimed in claim 9 in which said at least one other polyol includes a polyol selected from sorbitol-based polyols, sucrose-based polyols and mixtures thereof.

12. A composition as claimed in claim 9 in which said at least one other polyol includes a short chain polyol which reduces the viscosity of the polyol mixture.

13. A composition as claimed in claim 9 wherein the overall functionality of the mixture of polyols is at least about 3.

14. A composition as claimed in claim 9 wherein the overall functionality of the mixture of polyols is at least about 4.

15. A method of forming a fiber reinforced rigid polyurethane by reacting a polyol component with a polyisocyanate component in the presence of a blowing agent and in contact with fiber reinforcement, and wherein the polyol component comprises a polyol composition as claimed in claim 1.

16. A method as claimed in claim 15 in which the blowing agent comprises water.

17. A method as claimed in claim 15 in which the blowing agent is essentially free of chlorofluorocarbons.

18. A method as claimed in claim 15 in which the fiber reinforcement comprises glass fiber.

19. A polyol composition suitable for use in the production of fiber reinforced polyurethane foams, said composition comprising
(a) at least one amino polyol obtainable by reacting an alkylene oxide with an initiator which has a functionality greater than 2, at least one aromatic ring and at least one amino nitrogen atom and
(b) at least 3% by weight, based on the total weight of (a) plus (b), of an adduct of a tertiary amine and an alkylene carbonate, where the overall composition has a viscosity in the range of from about 750 to about 1500 mPa.s at 23° C.

20. The polyol composition of claim 19 in the absence of an additional viscosity-reducing agent.

21. The polyol composition of claim 19 in the absence of a chlorofluorocarbon blowing agent.

22. The polyol composition of claim 19 in which said adduct forms from 5 to 50% by weight of the total weight of (a) plus (b).

23. A method of forming a fiber reinforced rigid polyurethane by reacting a polyol component with a polyisocyanate component in the presence of a blowing agent and in contact with fiber reinforcement, wherein the polyol component comprises a polyol composition comprising
(a) at least one amino polyol obtainable by reacting an alkylene oxide with an initiator which has a functionality greater than 2, at least one aromatic ring and at least one amino nitrogen atom and
(b) at least 3% by weight, based on the total weight of (a) plus (b), of an adduct of a tertiary amine and an alkylene carbonate, where the overall composition has a viscosity in the range of from about 750 to about 1500 mPa.s at 23° C.

24. The method of claim 23 in the absence of an additional viscosity-reducing agent.

25. The method of claim 23 in the absence of a chlorofluorocarbon blowing agent.

26. The method of claim 23 in which said adduct forms from 5 to 50% by weight of the total weight of (a) plus (b).

27. A fiber reinforced rigid polyurethane by reacting a polyol component with a polyisocyanate component in the presence of a blowing agent and in contact with fiber reinforcement, wherein the polyol component comprises a polyol composition comprising
(a) at least one amino polyol obtainable by reacting an alkylene oxide with an initiator which has a functionality greater than 2, at least one aromatic ring and at least one amino nitrogen atom and (b) at least 3% by weight, based on the total weight of (a) plus (b), of an adduct of a tertiary amine and an alkylene carbonate, where the overall composition has a viscosity in the range of from about 750 to about 1500 mPa.s at 23° C.

28. The fiber reinforced rigid polyurethane of claim 27 in the absence of an additional viscosity-reducing agent.

29. The fiber reinforced rigid polyurethane of claim 27 in the absence of a chlorofluorocarbon blowing agent.

30. The fiber reinforced rigid polyurethane of claim 27 in which said adduct forms from 5 to 50% by weight of the total weight of (a) plus (b).

* * * * *